United States Patent
Kato et al.

(10) Patent No.: US 7,466,123 B2
(45) Date of Patent: Dec. 16, 2008

(54) ROTATION SENSOR, AND METHOD FOR OUTPUTTING SIGNALS FROM ROTATION SENSOR

(75) Inventors: Manabu Kato, Nagoya (JP); Eiji Fujioka, Kariya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 281 days.

(21) Appl. No.: 10/590,497

(22) PCT Filed: Feb. 21, 2005

(86) PCT No.: PCT/JP2005/002747

§ 371 (c)(1),
(2), (4) Date: Aug. 24, 2006

(87) PCT Pub. No.: WO2005/080995

PCT Pub. Date: Sep. 1, 2005

(65) Prior Publication Data

US 2007/0170912 A1    Jul. 26, 2007

(30) Foreign Application Priority Data

Feb. 24, 2004  (JP)  .............................. 2004-047547

(51) Int. Cl.
*G01P 15/00* (2006.01)
*G01P 3/48* (2006.01)

(52) U.S. Cl. .................................... 324/174; 73/514.39
(58) Field of Classification Search ........... 73/488–535, 73/514.39; 324/160–180, 174

See application file for complete search history.

(56) References Cited

U.S. PATENT DOCUMENTS

| 6,339,322 B1 | 1/2002 | Loreck et al. |
| 6,687,644 B1 | 2/2004 | Zinke et al. |
| 2004/0075450 A1 | 4/2004 | Buge et al. |
| 2005/0023896 A1 | 2/2005 | Fujioka et al. |

FOREIGN PATENT DOCUMENTS

| JP | 63-291199 A | 11/1988 |
| JP | 3-281452 A | 12/1991 |
| JP | 10-070524 A | 3/1998 |
| JP | 2001-505657 A | 4/2001 |
| JP | 2001/505691 A | 4/2001 |
| JP | 2001-165951 A | 6/2001 |
| JP | 2004-502998 A | 1/2004 |
| WO | 2005/088577 A1 | 9/2005 |
| WO | 2006/033211 A1 | 3/2006 |

*Primary Examiner*—Edward Lefkowitz
*Assistant Examiner*—Jonathan Dunlap
(74) *Attorney, Agent, or Firm*—Sughrue Mion, PLLC (57) ABSTRACT

A rotation sensor for outputting a pulse signal, which has a frequency corresponding to a rotation speed of a rotor, to a wire. The rotation sensor includes a modulation unit and an output unit. The modulation unit modulates an information signal representing information other than the rotation speed into a carrier wave having a frequency higher than the frequency of the pulse signal. The output unit superimposes and outputs to the wire the pulse signal and the carrier wave. Accordingly, the rotation sensor performs stable information transmission that is not dependent on the rotation speed of the rotor.

20 Claims, 5 Drawing Sheets

ROTATION SENSOR, AND METHOD FOR OUTPUTTING SIGNALS FROM ROTATION SENSOR

FIELD OF THE INVENTION

The present invention relates to a rotation sensor for outputting a pulse signal representing rotation speed of a rotor and a method for outputting a signal from a rotation sensor.

This is a National Stare entry of International Application PCT/JP2005/002747, with an international filing date of Feb. 21, 2005, which was published as WO 2005/080995 A1, and the complete disclosure of which is incorporated into this application by reference.

BACKGROUND OF THE INVENTION

Rotation sensors using an MR (magnetoresistor) element or a Hall element are known in the prior art. A rotation sensor has an internal circuit, which performs signal processing to output a pulse signal at a frequency proportional to the rotation speed of a rotor, which is the subject of detection.

A rotation sensor such as the rotation sensor described in Japanese Laid-Open Patent Publication No. 2001-165951 generates two types of pulse signals having different forms as pulse signals representing the rotation speed of a rotor. When the rotation speed of the rotor is low, the two types of pulse signals are used as an information signal showing the rotation direction through the difference in the forms. When the rotation speed of the rotor is high, the two types of pulse signals are separated by using one of the pulse signals as "0" information and the other one of the pulse signals as "1" information so that circuit failure diagnosis information and other information are used as a binary information signal.

Japanese Laid-Open Patent Publication No. 10-70524 describes a rotation sensor that digitizes different information for the rotation speed and rotation direction of a rotor. The digitized information superimposes between pulses, which are output at a frequency proportional to the rotation speed of the rotor, a different pulse train. Accordingly, the pulse train is used as an information signal showing different information for the rotation speed and rotation direction of the rotor.

In the rotation sensor of Japanese Laid-Open Patent Publication No. 2001-165951, selective information acquisition corresponding to the rotation speed (low speed, high speed) of the rotor, which is the detection subject, is necessary. Thus, one of the foregoing cannot be constantly monitored. Further, the output of the signal representing different information of the rotation speed and rotation direction of the rotor is dependent on the frequency of the pulse signal. Thus, it is difficult to obtain a stable information transmission speed (communication speed).

In the rotation sensor of Japanese Laid-Open Patent Publication No. 10-70524, the period during which the pulse train representing information can be superimposed is limited to the period between pulses, which are output at a frequency proportional to the rotation speed of the rotor. Accordingly, when the rotation speed of the rotor is high and the period between pulses is short, the pulse train representing information cannot be output.

SUMMARY OF THE INVENTION

It is an object of the present invention to provide a rotation sensor enabling stable information transmission that is not dependent on the rotation speed of a rotor and a method for outputting a signal from the rotation sensor.

To achieve the above object, the present invention provides a rotation sensor for outputting a pulse signal, which has a frequency corresponding to the rotation speed of a rotor. The rotation sensor includes a modulation unit and an output unit. The modulation unit modulates an information signal representing information other than the rotation speed into a carrier wave having a frequency higher than the frequency of the pulse signal. The output unit superimposes and outputs to a wire the pulse signal and the carrier wave.

Unlike the prior art, in the present invention, information signal representing information other than the rotation direction of the rotor is output to the wire as a carrier wave obtained through modulation in a state superimposed with the pulse so that the information signal is not dependent on the pulse frequency representing the rotation speed of the rotor. This realizes stable information transmission that is not dependent on the rotation speed of the rotor.

When the information signal is one of a plurality of information signals, the modulation unit modulates the plurality of information signals into a plurality of carrier waves having different frequencies that are higher than the frequency of the pulse signal.

In the present invention, the modulation unit modulates the plurality of information signals into a plurality of carrier waves having different frequencies that are higher than the frequency of the pulse signal. Accordingly, even if, for example, the information signal has a large amount of information, the information signal is divided into a plurality of information signals. By modulating the divided information signals into a plurality of carrier waves, the information amount that is simultaneously transmitted by the rotation sensor is increased. Further, for example, by changing the number of modulated carrier waves in accordance with the increase or decrease in the information amount of the information signal, the real time applicable capacity with respect to an increase in the information amount that is to be transmitted may be improved. Further, when there are plural types of information signals, the information signal may be modulated into different carrier waves. In this case, the information that is to be transmitted may be selected by selectively modulating the information signal corresponding to the required information into the corresponding carrier wave. That is, information signal corresponding to certain information may constantly be modulated into a corresponding carrier wave, and an information signal corresponding to other information may intermittently, in a periodic or non-periodic manner, be modulated into the corresponding carrier wave. In this manner, the rotation sensor may transmit selected information.

The rotation sensor may further include an acquisition unit for acquiring the information signal from an external information source. In the present invention, by acquiring the information signal from the external information source with the rotation sensor, the information signal is output to the wire as a whole. Accordingly, the external information source does not have to be wired for output of the information signal, and the necessary number of wires is reduced. The rotation sensor may detect the rotation speed of a vehicle wheel. The information signal may be a signal from a vehicle height sensor.

The rotation sensor may further include a reception modulation circuit for receiving the information signal from the external information source as a radio wave and demodulating the information signal. The information signal may be a signal from a tire air pressure sensor arranged in a tire.

The modulation unit may modulate the information signal and generate a carrier wave of 100 KHz to 10 MHz. The modulation unit may intermittently modulate the information signal into the carrier wave. The modulation unit may modulate the information signal by performing amplitude modulation to generate the carrier wave. In this case, the circuit configuration of the modulation unit is simplified. The modulation unit may modulate the information signal by performing frequency modulation to generate the carrier wave. In this case, the circuit configuration is simplified in comparison with when phase modulation is employed, and the reliability of information transmission is improved in comparison to when amplitude modulation is employed. The modulation unit may modulate the information signal by performing phase modulation to generate the carrier wave. In this case, the noise resistance during information transmission is improved.

Further, the present invention provides a method for outputting a signal from a rotation sensor. The method includes outputting a pulse signal having a frequency corresponding to a rotation speed of a rotor to a wire, modulating an information signal representing information other than the rotation speed into a carrier wave having a frequency higher than the frequency of the pulse signal, and superimposing and outputting to the wire the pulse signal and the carrier wave.

DETAILED DESCRIPTION OF THE INVENTION

Figure 1:
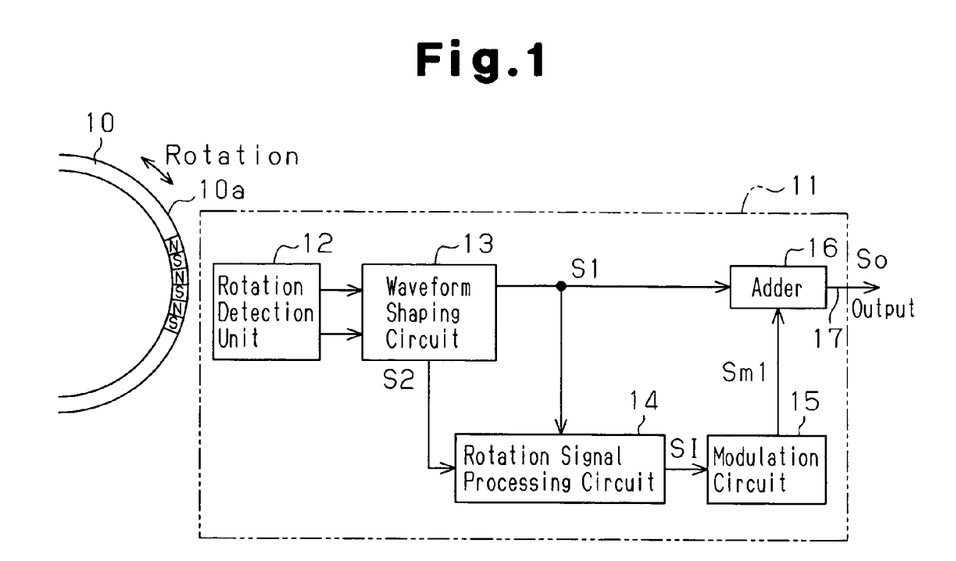
FIG. 1 is a block diagram showing a rotation sensor according to a first embodiment of the present invention.
Figure 2:
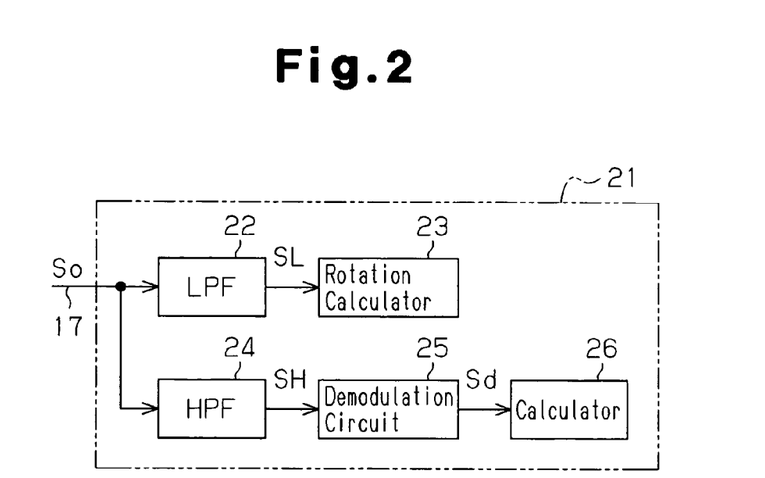
FIG. 2 is a block diagram showing a controller connected to the rotation sensor of FIG. 1.
Figure 3A:
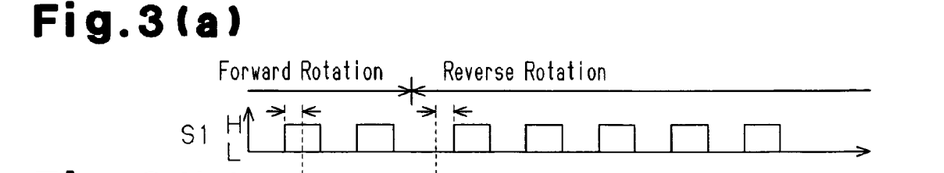
FIGS. 3(a) to 3(d) are time charts showing the operation of the rotation sensor of FIG. 1.
Figure 3B:
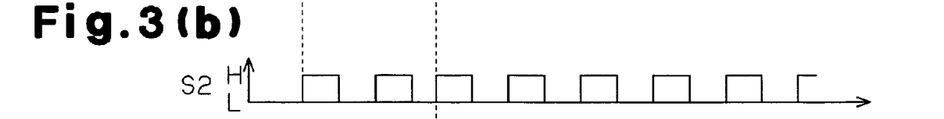
Figure 3C:
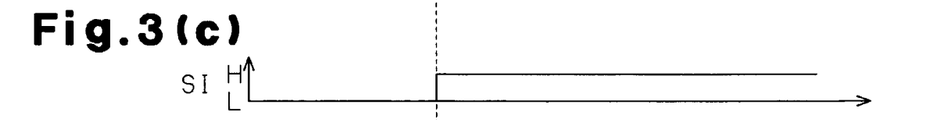
Figure 3D:
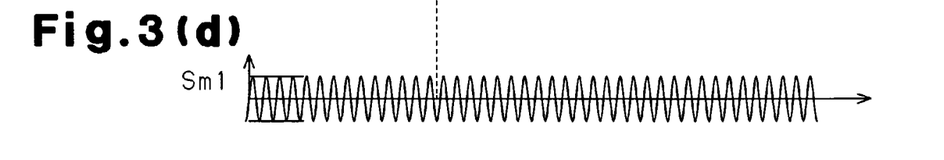
Figure 4A:
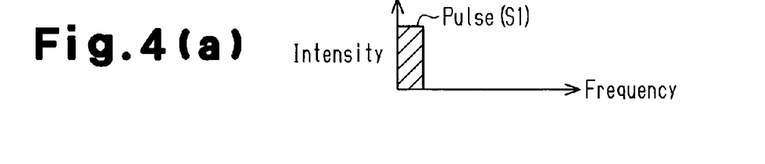
FIGS. 4(a) to 4(c) are schematic diagrams showing the relationship between the frequency and intensity of a plurality of signals shown in FIGS. 3(a) to 3(d)
Figure 4B:
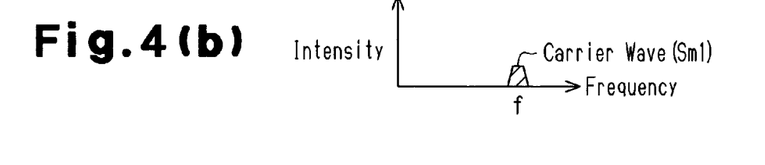
Figure 4C:
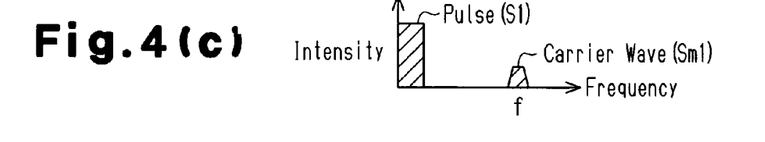

A rotation sensor according to a first embodiment of the present invention for detecting the rotation speed and rotation direction of a wheel for an automobile or the like will now be discussed with reference to FIGS. 1 to 4(d). FIG. 1 is a block diagram of a rotation sensor 11 for detecting rotation of a rotor 10, which is a detection subject. FIG. 2 is a block diagram of a controller 21 that receives a signal from the rotation sensor 11 via a wire (connection wire). FIGS. 3(a) to 3(d) are time charts for output signals generated by various types of circuits incorporated in the rotation sensor 11. FIGS. 4(a) to 4(c) are schematic diagrams showing the relationship between the frequency and intensity of these output signals.

As shown in FIG. 1, the rotor 10 has a peripheral portion defining a magnetic portion 10a in which N poles and S poles switch every predetermined angle. The rotor 10 rotates integrally with the wheel. The rotation sensor 11 is arranged facing towards the magnetic portion 10a. The rotation sensor 11 includes a rotation detection unit 12, a waveform shaping circuit 13, a rotation signal processing circuit 14, a modulation circuit 15, and an adder 16.

The rotation detection unit 12 includes two magnetic detection elements (e.g., magnetoresistor elements or Hall elements). These magnetic detection elements are opposed to the magnetic portion 10a of the rotor and are aligned along the circumferential direction of the rotor 10. Each magnet detection element generates a sine wave of which polarity switches in synchronism with the polarity switching of the opposing magnetic portion 10a as the rotor 10 rotates. The N poles and S poles of the magnetic portion 10a are set at a pitch that includes sine wave frequencies in a low frequency band (e.g., several tens of kHz or less) when in a normal vehicle traveling velocity range (e.g., up to 100 km/h).

The distance between the two magnetic detection elements is set to the distance obtained by multiplying the pitch between a pair of N and S poles by an integer and adding to or subtracting from the multiplied a distance corresponding to one fourth of the pitch. Accordingly, a phase difference corresponding to one fourth of a pitch is included between a pair of sine waves generated by the two magnetic detection elements. The rotation detection unit 12 outputs each of these generated sine waves to the waveform shaping circuit 13.

The waveform shaping circuit 13 makes a determination with each of the sine waves from the rotation detection unit 12 based on a threshold to generate rectangular pulse signals (DC pulse signals) S1 and S2 having the same frequency as the sine waves. These pulse signals S1 and S2 represent the rotation speed of the rotor 10. As shown in FIGS. 3(a) and 3(b), these pulse signals S1 and S2 switch levels (H and L) with a phase difference corresponding to the one fourth pitch. When the rotation direction of the rotor 10 is reversed, the phase difference is accordingly reversed. Here, when the rotor 10 is rotating in the forward direction, the pulse signal S1 is advanced from the pulse signal S2, and when the rotor 10 is rotating in the reverse direction, the pulse signal S2 is advanced from the pulse signal S1. The waveform shaping circuit 13 sends the pulse signal S1 to the rotation signal processing circuit 14 and the adder 16 and sends the pulse signal S2 to the rotation signal processing circuit 14.

The rotation signal processing circuit 14 generates an information signal SI, which represents the rotation direction of the rotor 10, based on the two pulse signals S1 and S2 from the waveform shaping circuit 13. More specifically, as shown in FIG. 3c, when the pulse signal S1 rises before the pulse signal S2 rises, that is, when the rotor 10 is rotating in the forward direction, the rotation signal processing circuit 14 generates the information signal S1 at an L level. When the pulse signal S2 rises before the pulse signal S1 rises, that is, when the rotor 10 is rotating in the reverse direction, the rotation signal processing circuit 14 generates the information signal S1 at an H level. The rotation signal processing circuit 14 sends the information signal SI to the modulation circuit 15.

The modulation circuit 15, which functions as a modulation unit, modulates the information signal SI from the rotation signal processing circuit 14 to a carrier wave. The carrier wave obtained through the modulation has a frequency f included in a frequency band (e.g., several hundred kHz to several MHz) that is higher than the frequency of the pulse signals S1 and S2. That is, the modulation circuit 15 modulates the information signal SI into a carrier wave by performing a modulation technique of one of amplitude modulation, frequency modulation, and phase modulation. The modulation circuit 15 sends the carrier wave obtained through the modulation to the adder as a modulated wave Sm1. The modulated wave Sm1 in FIG. 3(d) is shown as a monotonous sine wave for the sake of brevity but has a waveform that differs in accordance with the modulation technique before and after the level of the information signal SI switches.

The adder 16, which functions as an output unit, adds the pulse signal S1 from the waveform shaping circuit 13 to the modulated wave Sm1 to superimpose the pulse signal S1 and the modulated wave Sm1. The adder 16 sends the superimposed signal as an output signal So to an output wire 17, which is connected to the controller 21.

The relationship between the pulse signal S1 and the modulated wave Sm1 will now be discussed with reference to FIGS. 4(a) to 4(c). As shown in FIG. 4(a), the pulse signal S1 that represents the rotation speed of the rotor 10 is included in the above-described low frequency band. As shown in FIG. 4(b), the modulated wave Sm1 is included in a high frequency band, which is centered about the frequency f. Accordingly, as shown in FIG. 4(c), in the output signal So from the adder 16, the pulse signal S1 and the modulated wave Sm1 are in separate frequency bands although they are superimposed with each other. The rotation sensor 11 sends the pulse signal S1, which represents the rotation speed of the rotor 10, and the modulated wave Sm1, which includes information (information signal SI) of the rotation direction of the rotor 10, together to the single output wire 17 in a state in which they are in separate frequency bands.

The controller 21 will now be described. The controller 21 receives the output signal So of the rotation sensor 11 via the output wire 17. As shown in FIG. 2, the controller 21 includes a lowpass filter (LPF) 22, a rotation calculator 23, a highpass filter (HPF) 24, a demodulation circuit 25, and a calculator 26.

The LPF 22 is connected to the output wire 17. Further, the LPF 22 receives the output signal So. The LPF 22 allows passage of only the low frequency band signal (S1), which is included in the output signal So, as a low frequency signal SL and sends the signal SL to the rotation calculator 23. The low frequency signal SL is a signal from which high frequency components, or the modulated wave Sm1, is eliminated from the output signal So and corresponds to the pulse signal S1. The rotation calculator 23 acquires rotation speed information of the rotor 10 from the received low frequency signal SL (pulse signal S1).

The HPF 24 is also connected to the output wire 17. The HPF 24 also receives the output signal So. The HPF 24 allows passage of only the high frequency band signal (Sm1), which is included in the output signal So, as a high frequency signal SH and sends the signal SH to the demodulation circuit 25. The high frequency signal SH is a signal from which low frequency components, or the pulse signal S1, is eliminated from the output signal So and corresponds to the demodulated wave Sm1. The demodulation circuit 25 demodulates the high frequency signal SH to extract the desired information (information signal SI) and sends the extracted information as the information signal Sd to the calculator 26. Based on the received information signal Sd, the calculator 26 acquires information of the rotation direction of the rotor 10.

The present embodiment has the advantages described below.

(1) In the present embodiment, the information signal SI, which represents information (rotation direction) excluding the rotation speed of the rotor 10, is modulated to a carrier wave (demodulated wave Sm1), superimposed with the pulse signal S1, and sent to the output wire 17. Thus, unlike the prior art, the information signal S1, which represents the rotation direction of the rotor 10, is not dependent on the frequency of the pulse signals S1 and S2, which represent the rotation speed of the rotor 10. Accordingly, the rotation sensor 11 realizes stable information transmission that is not dependent on the rotation speed of the rotor 10. That is, information is transmitted at the required transmission speed and in the required amount regardless of the rotation sped of the rotor 10.

Further, the rotation sensor 11 sends the pulse signal S1 and the information signal SI (modulated signal Sm1) to the output wire 17 in a state combined by the adder 16. This reduces the number of wires for information transmission in the rotation sensor 11.

(2) In the present embodiment, when the rotation sensor 11 employs amplitude modulation as the signal modulation technique, the circuit configuration of the modulation circuit 15 is simplified. When the rotation sensor 11 employs phase modulation as the modulation technique, noise resistance for information transmission is improved. Further, when the rotation sensor 11 employs frequency modulation as the modulation technique of the rotation sensor 11, the circuit configuration of the modulation circuit 15 is simplified in comparison with when phase modulation is employed, and the reliability of information transmission is improved in comparison with when amplitude modulation is employed.

A second embodiment of the present invention will now be discussed with reference to FIGS. 5 and 6. A rotation sensor 31 of the second embodiment has a structure in which the rotation sensor 11 of the first embodiment is modified so as to generate a plurality of information signals representing multiple (two types) of information other than the rotation speed of the rotor 10 and to modulate the information signals into carrier waves having different frequencies. Parts of the rotation sensor 31 that are the same as the rotation sensor 11 will not be described in detail.

Figure 5:
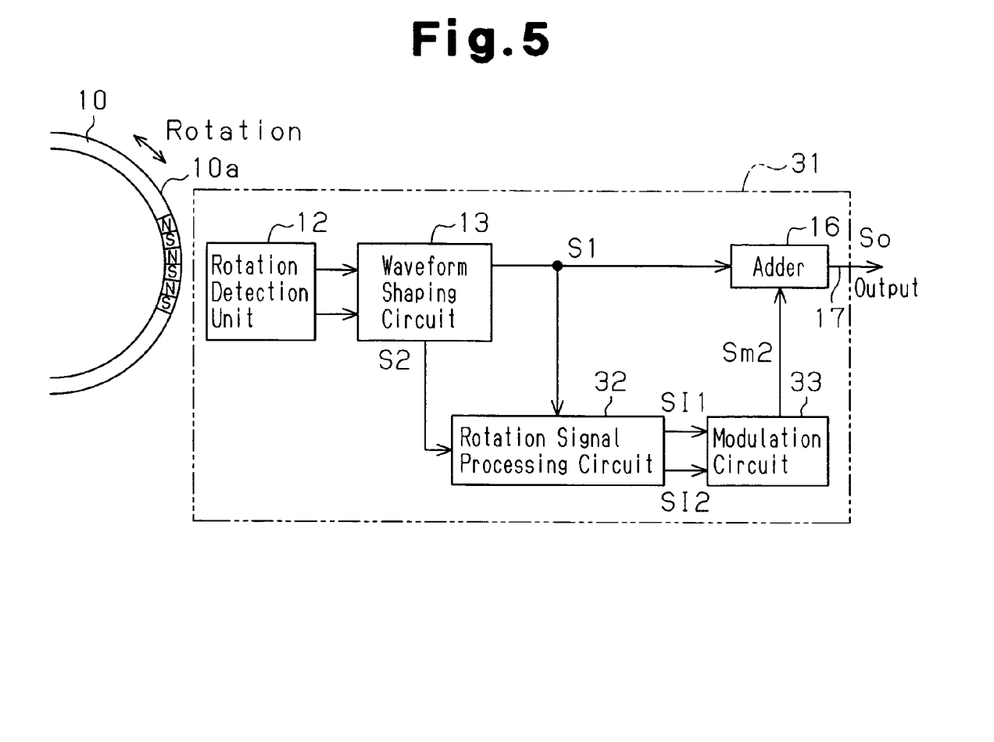
FIG. 5 is a block diagram of a rotation sensor according to a second embodiment of the present invention.
Figures 6A, 6B, 6C:
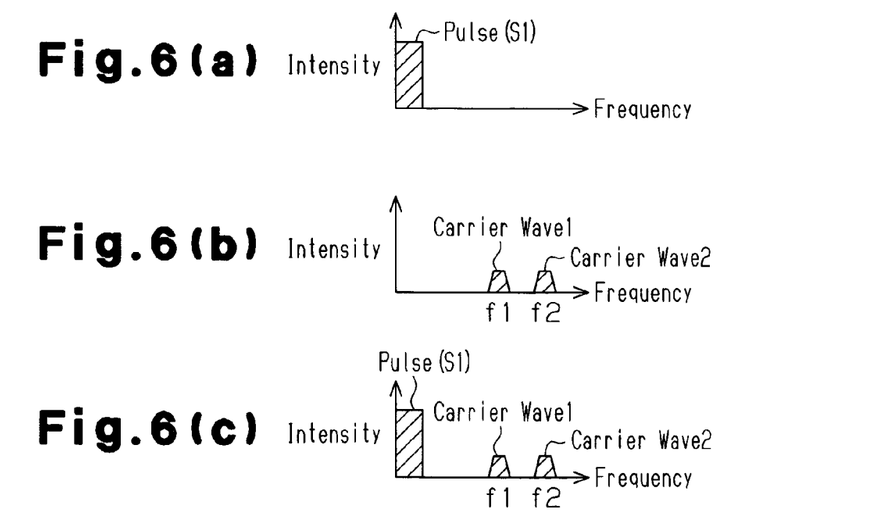
FIGS. 6(a) to 6(c) are schematic diagrams showing the relationship between the frequency and intensity of a plurality of signals in the rotation sensor of FIG. 5.

FIG. 5 is a block diagram of the rotation sensor 31, which detects the rotation of the rotor 10. FIG. 6 is a schematic diagram showing the relationship between the frequency and intensity of output signals generated by various circuits incorporated in the rotation sensor 31.

As shown in FIG. 5, the rotation sensor 31 includes the rotation detection unit 12, the waveform shaping circuit 13, the adder 16, a rotation signal processing circuit 32, and a modulation circuit 33.

In the same manner as the rotation signal processing circuit 14 of the first embodiment, the rotation signal processing circuit generates information signal SI1 (corresponding to SI shown in FIG. 3(c)), which represents the rotation direction of the rotor 10, based on the two pulse signals S1 and S2 from the waveform shaping circuit 13. In addition to the information signal SI1, the rotation signal processing circuit 32 generates an information signal SI2, which represents diagnostic failure information of the rotation detection unit 12 (magnetic detection element), based on the two pulse signals S1 and S2. More specifically, the rotation signal processing circuit 32 separately determines the operation state (normal or abnormal) of the two magnetic detection elements based on the two pulse signals S1 and S2 to generate a binary signal, which has a pattern that differs depending on the determination result, as the information signal SI2. The rotation signal processing circuit 32 sends these information signals SI1 and SI2 to the modulation circuit 33.

The modulation circuit 33 modulates the information signal SI1 from the rotation signal processing circuit 32 into a carrier wave having frequency f1, which is included in a frequency band (e.g., several hundred kHz to several MHz) that is higher than the frequencies of the pulse signals S1 and S2. That is, the modulation circuit 33 modulates the information signal SI1 into a carrier wave by performing the modulation technique of one of amplitude modulation, frequency modulation, and phase modulation.

The modulation circuit 33 modulates the other information signal SI2 from the rotation signal processing circuit SI2 into a carrier wave having frequency f2, which is higher than frequency f1. That is, the modulation circuit 33 modulates the information signal SI2 into a carrier wave by performing the modulation technique of one of amplitude modulation, frequency modulation, and phase modulation.

The modulation circuit 33 superimposes these two modulated carrier waves and sends a modulated wave Sm2 to the adder 16.

The adder 16 superimposes the pulse signal S1 from the waveform shaping circuit 13 with the modulated wave Sm2 and sends an output signal So to the output wire 17. This is performed in the same manner as in the first embodiment and thus will not be described.

The relationship of the frequencies of the pulse signal S1 and the modulated wave Sm2 will now be described with reference to FIG. 6. As shown in FIG. 6(a), the pulse signal S1, which represents the rotation speed of the rotor 10, is included in the low frequency band. As shown in FIG. 6(b), the modulated wave Sm2 is included in a high frequency band that is centered about the frequency f1 of one of the carrier waves and a high frequency band that is centered about the frequency f2 of the other one of the carrier waves. These two high frequency bands are separated. Accordingly, as shown in FIG. 6(c), although the pulse signal S1 and the modulated wave Sm2 are superimposed with each other, the output signal So of the adder 16 is in separate frequency bands. That is, the rotation sensor 31 sends the pulse signal S1, which represents the rotation speed of the rotor 10, and the modulated wave Sm2, which includes rotation direction information (information signal SI1) and failure diagnostic information (information signal SI2), together to the single output wire 17 in different frequency bands.

The output signal So output via the output wire 17 is processed by a controller similar to the controller 21 of the first embodiment. Instead of the HPF 24, the controller of the present embodiment includes a bandpass filter (BPF) that allows passage of only signals in the high frequency band centered about the frequency f1 and a BPF (or HPF) that allows passage of only signals in the high frequency band centered about the frequency f2. The controller includes a plurality of (two) demodulation circuits for separately demodulating these band passage signals. Accordingly, the controller acquires information of the rotation direction of the rotor 10 and failure diagnostic information of the rotation detection unit 12.

As described above in detail, the present embodiment has the advantage described below in addition to the same advantages as the first embodiment.

(1) The modulation circuit 33 of the present embodiment modulates the information signals SI1 an SI2 into carrier waves having different frequencies f1 and f2, which are higher than the frequencies of the pulse signals S1 and S2. That is, the modulation circuit 33 modulates the information signals S11 and S12 into different carrier waves. In this case, the rotation sensor 31 may select the information that is to be transmitted by selectively modulating the information signal corresponding to the required information into the corresponding carrier wave. For example, the information signal SI1 corresponding to the rotation direction information may constantly be modulated into the corresponding carrier wave, and the information signal corresponding to the failure diagnostic information may intermittently, in a periodic or non-periodic manner, be modulated into the corresponding carrier wave. In this manner, the rotation sensor 31 may select information.

A third embodiment of the present invention will now be discussed with reference to FIG. 7. A rotation sensor 36 of the third embodiment has a structure in which the first embodiment is modified so that an external information signal representing information other than the rotation speed of the rotor 10 is also acquired. Parts that are the same as the first embodiment will not be described in detail.

Figure 7:
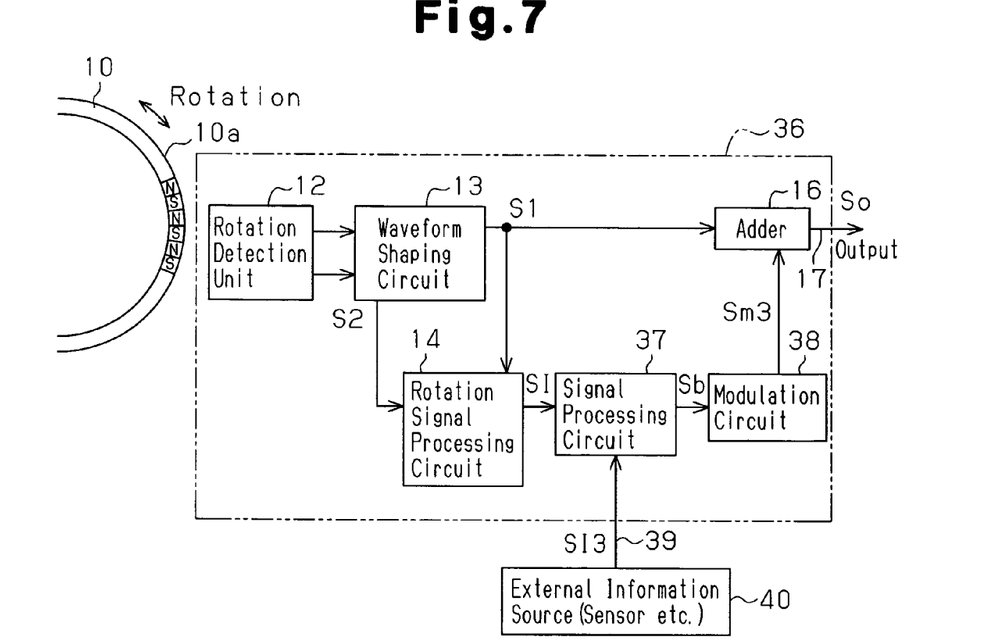
FIG. 7 is a block diagram of a rotation sensor according to a third embodiment of the present invention.

FIG. 7 is a block diagram of the rotation sensor 36, which detects the rotation of the rotor 10. As shown in FIG. 7, the rotation sensor 36 includes the rotation detection unit 12, the waveform shaping circuit 13, the rotation signal processing circuit 14, the adder 16, a signal processing circuit 37, and a modulation circuit 38.

The signal processing circuit 37, which functions as an acquisition unit, acquires the information signal SI generated by the rotation signal processing circuit 14. In other words, the signal processing circuit 37 receives the information signal SI. Further, the signal processing circuit 37 is connected to an external information source 40 via an external wire 39. The external information source 40 is a sensor arranged in the vicinity of the rotation sensor 36 such as a vehicle height sensor or a brake pad wear sensor. In a vehicle having a body of which height is adjustable, the vehicle height sensor detects the height of the body. The signal processing circuit 37 receives an information signal SI3 output from the external information source 40 via the external wire 39. The signal processing circuit 37 divides the acquisition period (input period) of the information signal SI and the acquisition period (input period) of the external information signal SI3 in accordance with a predetermined standard. The signal processing circuit 37 arranges the information signals SI and SI3 in chronological order and generates the information signal Sb. The signal processing circuit 37 sends the chronologically ordered information signal Sb to the modulation circuit 38.

The modulation circuit 38 modulates the information signal Sb from the signal processing circuit 37 into a carrier wave having frequency f, which is included in a frequency band (e.g., several hundred kHz to several MHz) that is higher than the frequency of the pulse signals S1 and S2. That is, the modulation circuit 38 modulates the information signal Sb into a carrier wave by performing a modulation technique of one of amplitude modulation, frequency modulation, and phase modulation. The modulation circuit 38 sends the carrier wave, which is obtained through the modulation, to the adder 16 as a modulated wave Sm3.

The adder 16 superimposes the pulse signal S1 from the waveform shaping circuit 13 with the modulated wave Sm3 and sends the output signal So to the output wire 17. Since this is performed in the same manner as in the first embodiment, this will not be described in detail.

The output signal So output via the output wire 17 is processed by a controller corresponding to the controller 21 of the first embodiment. In this case, the controller extracts the desired information (information signals SI and SI3) by dividing the information signal Sd (refer to FIG. 2), which passes through the HPF 24 to be demodulated by the demodulation circuit 25, in accordance with a predetermined standard. As a result, the calculator 26 of the controller acquires rotation direction information of the rotor 10 and external information.

As described above, in addition to the advantages of the first embodiment, the present embodiment has the advantage described below.

(1) The rotation sensor 36 of the present embodiment acquires the information signal SI3 from the external information source 40 via the external wire 39 or the like so that the information signal SI3 (modulated wave Sm3) is sent as a whole to the output wire 17 by the adder 16. Accordingly, the external information source 40 does not require wiring for outputting the external information source. This reduces the number of necessary wires.

A fourth embodiment of the present invention will now be described with reference to FIG. 8. A rotation sensor 41 of the fourth embodiment has a structure in which the third embodiment is modified so that a further external information signal representing information other than the rotation speed of the rotor 10 is acquired through wireless communication. Parts that are the same will not be described in detail.

Figure 8:
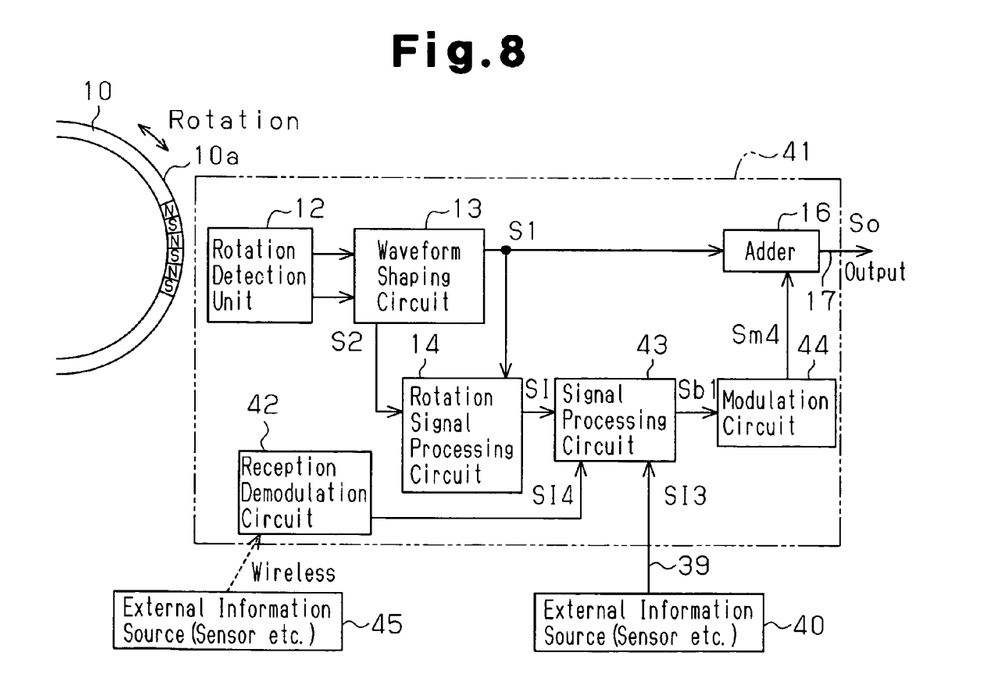
FIG. 8 is a block diagram of a rotation sensor according to a fourth embodiment of the present invention.

FIG. 8 is a block diagram of the rotation sensor 41, which detects the rotation of the rotor 10. As shown in FIG. 8, the rotation sensor 41 includes the rotation detection unit 12, the waveform shaping circuit 13, the rotation signal processing circuit 14, the adder 16, a reception demodulation circuit 42, a signal processing circuit 43, and a modulation circuit 44, a signal processing circuit 37, and a modulation circuit 38.

The reception demodulation circuit 42, which functions as an acquisition unit, performs wireless communication with an external information source 45. The external information source 45 is a sensor, such as a tire air pressure sensor, that is difficult to connect to the rotation sensor 41 with wires. The reception demodulation circuit 42 demodulates radio waves transmitted from the external information source 45 to acquire an information signal SI4. The reception demodulation circuit 42 sends the information signal SI4 to the signal processing circuit 43.

The signal processing circuit 43 acquires the information signal SI generated by the rotation signal processing circuit 14. Further, the signal processing circuit 43 acquires the information signal S13 from the external information source 40 via the external wire 39. The signal processing circuit 43 acquires the information signal SI4 output from the reception demodulation circuit 42. The signal processing circuit 43 divides the acquisition period of the information signal SI and the external information signals SI3 and SI4 in accordance with a predetermined standard. Then, the signal processing circuit 43 arranges the information signals SI, SI3, and SI4 in chronological order and generates information signal Sb1. The signal processing circuit 43 sends the chronologically ordered information signal Sb1 to the modulation circuit 44.

The modulation circuit 44 modulates the information signal Sb1 from the signal processing circuit 43 into a carrier wave having frequency f, which is included in a frequency band (e.g., several hundred kHz to several MHz) that is higher than the frequency of the pulse signals S1 and S2. That is, the modulation circuit 44 modulates the information signal Sb1 into a carrier wave by performing a modulation technique of one of amplitude modulation, frequency modulation, and phase modulation. The modulation circuit 44 sends the carrier wave, which is obtained through the modulation, to the adder 16 as a modulated wave Sm4.

The adder 16 superimposes the pulse signal S1 from the waveform shaping circuit 13 with the modulated wave Sm4 and sends the output signal So to the output wire 17. Since this is performed in the same manner as in the third embodiment, this will not be described in detail.

The output signal So output via the output wire 17 is processed by a controller corresponding to the controller of the third embodiment. The controller of the present embodiment extracts the desired information (information signals SI, SI3, and SI4) by dividing the information signal Sd (refer to FIG. 2), which passes through the HPF 24 to be demodulated by the demodulation circuit 25, in accordance with a predetermined standard. As a result, the calculator 26 of the controller acquires rotation direction information of the rotor 10 and external information.

As described above, in addition to the advantages of the third embodiment, the present embodiment has the advantage described below.

(1) The rotation sensor 41 of the present embodiment acquires the information signal (SI4) of the external information source 45 through wireless communication so that the information signal SI4 (modulated wave Sm4) is sent as a whole to the output wire 17 by the adder 16. Accordingly, the rotation sensor 41 may output the information of the external information source 45 even when it is difficult for the external information source 45 to output an information signal through a wire.

A fifth embodiment of the present invention will now be described with reference to FIG. 9. A rotation sensor 46 of the fifth embodiment has a structure in which the third embodiment is modified so that a further external information signal representing information other than the rotation speed of the rotor 10 is also acquired through wireless communication. Parts that are the same will not be described in detail.

Figure 9:
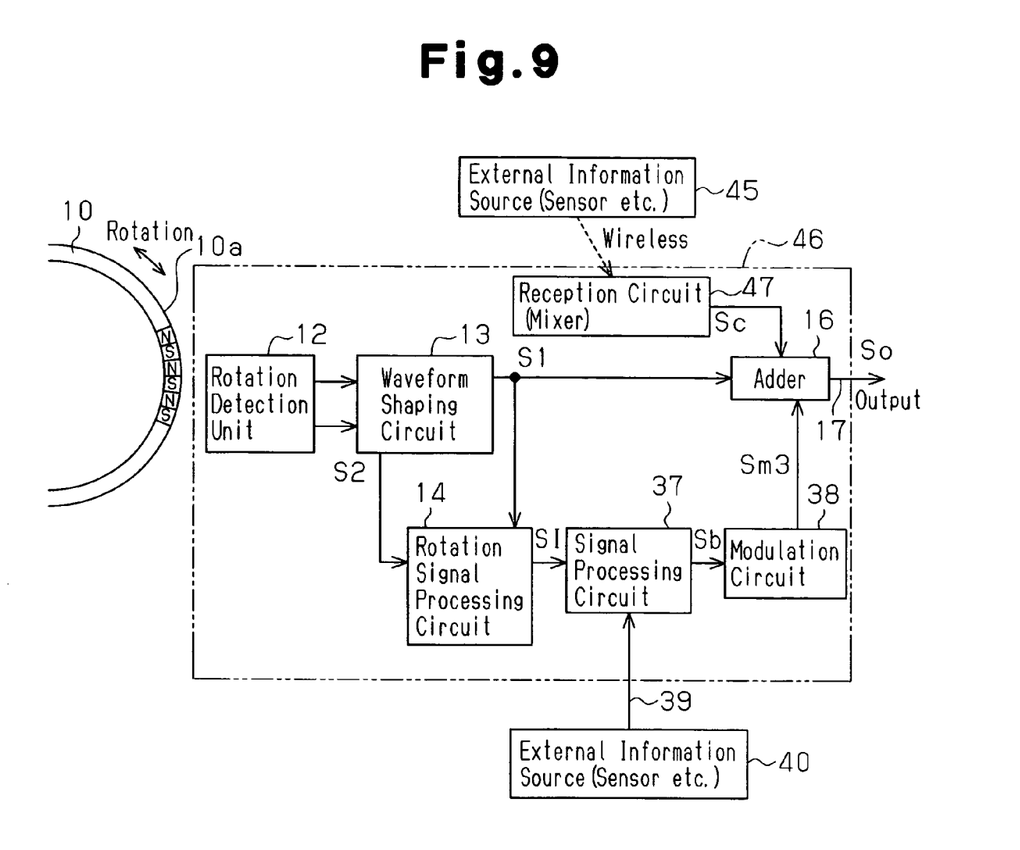
FIG. 9 is a block diagram of a rotation sensor according to a fifth embodiment of the present invention.

FIG. 9 is a block diagram of the rotation sensor 46, which detects the rotation of the rotor 10. As shown in FIG. 8, the rotation sensor 46 includes the rotation detection unit 12, the waveform shaping circuit 13, the rotation signal processing circuit 14, the adder 16, the signal processing circuit 37, the modulation circuit 38, and a reception circuit (mixer) 47.

The reception circuit 47 performs wireless communication with the external information source 45. The reception circuit 47 frequency-converts the radio wave transmitted from the external information source 45 into frequency fn, which differs from the frequency f and which is included in a frequency band (e.g., several hundred kHz to several MHz) that is higher than the frequency of the pulse signals S1 and S2, to acquire information signal Sc. The reception circuit 47 sends the information signal Sc to the adder 16.

The adder 16 superimposes the information signal Sc from the reception circuit 47 with the pulse signal S1 from the waveform shaping circuit 13 and the modulated wave Sm3 from the modulation circuit 38 to send the output signal So to the output wire 17. That is, the rotation sensor 46 sends to the single output wire 17 the pulse signal representing the rotation speed of the rotor 10, the modulated wave Sm3 including the rotation direction information of the rotor 10 and the external information acquired via the external wire 39, and the external information (information signal Sc) acquired through wireless communication.

In the output signal So, the pulse signal S1, which represents the rotation speed of the rotor 10, is included in the low frequency band. Further, the demodulated wave Sm3 is included in the high frequency band centered about the frequency f of the carrier wave, and the information signal Sc is included in the high frequency band centered about the frequency fm. That is, the high frequency bands of the high frequencies f and fm are separated from each other. Accordingly, in the output signal So of the adder 16, the pulse signal S1, the modulated wave Sm3, and the information signal Sc are superimposed with one another but are separated from one another in terms of frequency bands.

The output signal So output via the output wire 17 is processed by a controller corresponding to that of the second embodiment. In lieu of the HPF 24, the controller includes a bandpass filter (BPF), which enables passage of a signal in the high frequency band centered about the frequency f, and a BPF, which enables passage of a signal in the high frequency band centered about the frequency fm. The controller includes a plurality of demodulation circuits 25 for separately demodulating these band passage signals. Thus, the controller acquires the rotation direction of the rotor 10, the external information via the external wire 39, and the external information acquired through wireless communication by the rotation sensor 46.

As described above in detail, in addition to the advantages of the fourth embodiment, the present embodiment has the advantage described below (1) In the present embodiment, the radio waves (information signal) from the external information source 45 is frequency-converted in the reception circuit 47 into the information signal Sc and directly sent to the output wire 17 via the adder 16. Unlike the fourth embodiment, demodulation (reception demodulation circuit 42) is not necessary when receiving the information signal Sc and modulation (modulation circuit 44) for output to the output wire 17. This simplifies the circuit configuration of the rotation sensor 46.

The above embodiments may be modified as described below.

In the first embodiment, in lieu of the HPF 24, a BPF that enables passage of a high frequency band signal including an information signal may be employed.

In the first and third to fifth embodiments, the rotation signal processing circuit 14 does not have to generate an information signal representing the rotation speed of the rotor and may generate an information signal representing failure diagnosis information of the rotation detection unit 12 (magnetic detection element) based on the two pulse signals S1 and S2.

Like the prior art example (refer to Japanese Laid-Open Patent Publication No. 2001-165951), when the pulse signals (S1 and S2), which represent the rotation speed of the rotor, can be deformed to have plural types of forms, information other than that of the rotation speed may be transmitted through a selected and deformed pulse signal or in combination with such a signal. Such deformation of the pulse signal may be performed through, for example, pulse amplitude modulation (PAM) and pulse width modulation (PWM). Even when information transmission is performed through such deformation of the pulse signal, a further information signal representing different information may be modulated into a carrier wave and be superimposed with the pulse signal to be output from the output wire 17. In this case, for example, low priority information may be transmitted in combination with the deformed pulse signal, and high priority information may frequently be transmitted by a carrier wave (modulated wave) obtained through modulation.

When a rotation sensor includes a modulation circuit, which modulates an information signal into a plurality of carrier waves having different frequencies that are higher than the frequencies of the pulse signals S1 and S2, even if, for example, the information signal has a large amount of information, by modulating information signals, which divide the information into a plurality of segments, into a plurality of carrier waves, the information amount that is simultaneously transmitted may be increased. Further, for example, by changing the number of modulated carrier waves in accordance with the increase or decrease in the information amount of the information signal, the real time applicable capacity with respect to an increase in the information amount that is to be transmitted may be improved.

The information signal representing information other than the rotation speed of the rotor 10 may be an analog signal or a digital signal. The rotor 10, which is the subject of rotation detection, is not limited to a wheel and may be used in, for example, an engine crankshaft or an input shaft and output shaft of a gear transmission. Information other than the rotation speed may be, for example, the oil temperature or oil pressure of operation oil detected by an oil temperature sensor and an oil pressure sensor.

The rotor 10 may be a timing rotor having a peripheral surface with ridges and valleys formed at predetermined angular intervals. In such a case, the rotation sensor 11 (rotation detection unit 12) may be a pickup coil for detecting the ridges and valleys in the peripheral surface of the rotor 10.

The invention claimed is:

1. A rotation sensor for outputting a pulse signal, which has a frequency corresponding to a rotation speed of a rotor, to an output wire, the rotation sensor comprising:
    a rotation detection unit for outputting a signal corresponding to the rotation speed of the rotor;
    a waveform shaping unit for receiving an output signal from the rotation detection unit and outputting a pulse signal corresponding to the received signal;
    a first signal processing unit for receiving the pulse signal output from the waveform shaping unit and outputting a first information signal based on the received pulse signal;
    a second signal processing unit for receiving the first information signal output from the first signal processing unit, receiving a first external information signal from a first external information source through an input wire, and outputting a second information signal including the first information signal and the first external information signal;
    a modulation unit for receiving the second information signal output from the second signal processing unit, modulating the received second information signal into a carrier wave having a first frequency that is higher than the frequency of the pulse signal, and outputting the carrier wave;
    a reception unit for receiving a second external information signal from a second external information source through a wireless communication, frequency converting the received second external information signal to a third information signal having a second frequency that is different from the first frequency and is higher than the frequency of the pulse signal, and outputting the third information signal; and
    an adding unit for receiving the pulse signal output from the waveform shaping unit, the carrier wave output from the modulation unit, and the third information signal output from the reception unit to output to the output wire an output signal obtained by superimposing the received pulse signal, carrier wave, and third information signal.

2. The rotation sensor according to claim 1, wherein the rotation sensor detects the rotation speed of a vehicle wheel.

3. The rotation sensor according to claim 1, wherein the second external information signal is a signal from a tire air pressure sensor arranged in a tire.

4. The rotation sensor according claim 1, wherein the first external information signal is a signal from a vehicle height sensor.

5. The rotation sensor according to claim 1, wherein:
    the first frequency is a frequency in a range of 100 KHz through 10 MHz.

6. The rotation sensor according to claim 1, wherein:
    the modulation unit intermittently modulates the second information signal into the carrier wave.

7. The rotation sensor according to claim 1, wherein:
the modulation unit modulates the second information signal by performing amplitude modulation to generate the carrier wave.

8. The rotation sensor according to claim 1, wherein:
the modulation unit modulates the second information signal by performing frequency modulation to generate the carrier wave.

9. The rotation sensor according to claim 1, wherein:
the modulation unit modulates the second information signal by performing phase modulation to generate the carrier wave.

10. The rotation sensor according to claim 2, wherein the second external information signal is a signal from a tire air pressure sensor arranged in a tire.

11. The rotation sensor according to claim 2, wherein the first external information signal is a signal from a vehicle height sensor.

12. The rotation sensor according to claim 3, wherein the first external information signal is a signal from a vehicle height sensor.

13. The rotation sensor according to claim 10, wherein the first external information signal is a signal from a vehicle height sensor.

14. The rotation sensor according to claim 2, wherein:
the first frequency is a frequency in a range of 100 KHz through 10 MHz.

15. The rotation sensor according to claim 3, wherein:
the first frequency is a frequency in a range of 100 KHz through 10 MHz.

16. The rotation sensor according to claim 4, wherein:
the first frequency is a frequency in a range of 100 KHz through 10 MHz.

17. The rotation sensor according to claim 10, wherein:
the first frequency is a frequency in a range of 100 KHz through 10 MHz.

18. The rotation sensor according to claim 2, wherein:
the modulation unit intermittently modulates the second information signal into the carrier wave.

19. The rotation sensor according to claim 3, wherein:
the modulation unit intermittently modulates the second information signal into the carrier wave.

20. The rotation sensor according to claim 4, wherein:
the modulation unit intermittently modulates the second information signal into the carrier wave.

* * * * *